United States Patent
Kaminsky et al.

(10) Patent No.: US 6,181,925 B1
(45) Date of Patent: Jan. 30, 2001

(54) METHOD AND APPARATUS FOR FRAUD CONTROL IN A CELLULAR TELEPHONE SWITCH

(75) Inventors: William J. Kaminsky, Walnut Creek; Robert C. Medina, Danville; David Leighton Daniels, Placentia; Matthew John Parzych, San Francisco, all of CA (US)

(73) Assignee: Cellco Partnership, Bedminster, NJ (US)

( * ) Notice: Under 35 U.S.C. 154(b), the term of this patent shall be extended for 0 days.

(21) Appl. No.: 08/826,374

(22) Filed: Apr. 9, 1997

(51) Int. Cl.[7] .................................................. H04M 1/66
(52) U.S. Cl. ............................................ 455/410; 455/411
(58) Field of Search ..................................... 455/404, 410, 455/411, 414, 418, 422, 423, 424; 380/20

(56) References Cited

U.S. PATENT DOCUMENTS

| | | | | |
|---|---|---|---|---|
| 5,031,204 | * | 7/1991 | McKernan | 455/411 |
| 5,329,591 | | 7/1994 | Magrill | 380/25 |
| 5,335,265 | * | 8/1994 | Copper et al. | 455/411 |
| 5,335,278 | | 8/1994 | Matchett et al. | 380/23 |
| 5,345,595 | * | 9/1994 | Johnson et al. | 455/410 |
| 5,420,908 | | 5/1995 | Hodges et al. | 455/410 |
| 5,420,910 | * | 5/1995 | Rudokas et al. | 455/410 |
| 5,448,760 | | 9/1995 | Frederick | 455/411 |
| 5,463,681 | | 10/1995 | Vaios et al. | 379/189 |
| 5,483,465 | * | 1/1996 | Grube et al. | 364/516 |
| 5,555,551 | * | 9/1996 | Rudokas et al. | 455/410 |
| 5,734,977 | * | 3/1998 | Sanmugam | 455/410 |
| 5,752,189 | * | 5/1998 | Ueno et al. | 455/435 |
| 5,809,412 | * | 9/1998 | Daurio et al. | 455/410 |
| 5,825,750 | * | 10/1998 | Thompson | 455/410 |
| 5,826,186 | * | 10/1998 | Mitchell et al. | 455/410 |
| 5,835,857 | * | 11/1998 | Otten | 455/410 |

FOREIGN PATENT DOCUMENTS

| | | |
|---|---|---|
| 2114040 | 9/1994 | (CA) . |
| WO 93/11646 | 6/1993 | (WO) . |

* cited by examiner

*Primary Examiner*—Daniel S. Hunter
*Assistant Examiner*—Darnell R. Armstrong
(74) *Attorney, Agent, or Firm*—Gates & Cooper

(57) ABSTRACT

A method and apparatus for fraud control using enhanced techniques with the call interdiction feature of a switch. A system in accordance with the principles of the present invention includes a fraud control system that monitors calls, identifies both legitimate and fraudulent cellular phones, discriminates legitimate cellular phones from fraudulent cellular phones, and then transmits an interdiction message to the switch, wherein the interdiction message instructs the switch to terminate calls placed from fraudulent cellular phones, while allowing calls placed by legitimate cellular phones to continue undisturbed.

14 Claims, 5 Drawing Sheets

METHOD AND APPARATUS FOR FRAUD CONTROL IN A CELLULAR TELEPHONE SWITCH

CROSS-REFERENCE TO RELATED APPLICATIONS

This patent application is related to:

Application Ser. No. 08/633,406, filed on Jun. 10, 1996, by William J. Kaminsky et al., now U.S. Pat. No. 5,950,121, issued Sep. 7, 1999 and entitled "METHOD AND APPARATUS FOR FRAUD CONTROL IN CELLULAR TELEPHONE SYSTEMS", which is a continuation-in-part of Ser. No. 08/389,348 below, and is a continuation-in-part of Application Ser. No. 08/657,974, filed on May 30, 1996, by Ronald S. Rudokas, et al., and entitled "METHOD AND APPARATUS FOR FRAUD CONTROL IN CELLULAR TELEPHONE SYSTEMS UTILIZING RF SIGNATURE COMPARISON", which is a continuation of Ser. No. 08/389,348 below, Application Ser. No. 08/389,348, filed Feb. 16, 1995, by Ronald S. Rudokas, et al., now U.S. Pat. No. 5,555,551, issued Sep. 10, 1996 and entitled "METHOD AND APPARATUS FOR FRAUD CONTROL IN CELLULAR TELEPHONE SYSTEMS UTILIZING RF SIGNATURE COMPARISON", which is a divisional of Ser. No. 08/084,367 below, and Application Ser. No. 08/084,367, filed Jun. 29, 1993, by Ronald S. Rudokas, et al., now U.S. Pat. No. 5,420,910, issued May 30, 1995, and entitled "METHOD AND APPARATUS FOR FRAUD CONTROL IN CELLULAR TELEPHONE SYSTEMS UTILIZING RF SIGNATURE COMPARISON";

all of which are incorporated by reference herein.

BACKGROUND OF THE INVENTION

1. Field of the Invention

This invention relates in general to radio frequency (RF) communication systems, and in particular, to a method and apparatus for fraud control in cellular mobile radiotelephone (CMR) and personal communications services (PCS) systems.

2. Description of Related Art

Cellular phones combine the mobility of the radio link and the world-wide land telephone network to provide a communication link to any other telephone in the world. However, as cellular phones have become more prevalent throughout the country, fraud has become a major problem. Cellular phone fraud robs service providers of hundreds of millions of dollars every year. Like all crimes, there are several varieties of cellular fraud, including "cloning."

Cloning fraud, which occurs when a legitimate subscriber's mobile identification number (MIN) and electronic serial number (ESN) combination is used for illegal purposes, is among the most sophisticated and difficult forms of fraud to prevent. Often, the fraudulent user will use simple electronic receivers to "capture" the legitimate MIN/ESN combination during its transmission. In these cases, the legitimate subscriber often does not know fraud is being committed. This is currently the most popular method of gaining illegal access to a cellular system because the legitimacy of the stolen MIN/ESN combinations makes cloning difficult to catch.

Techniques exist for identifying situations in which two cellular phones with the same MIN/ESN combination are making a call at the same time. Motorola Technical Education and Documentation, 68P09222A54-O, of Aug. 14, 1994 entitled "Clone Clear Feature", which is incorporated by reference herein, discloses a method of detecting duplicate MIN/ESN combinations present on a switch simultaneously and for dealing with such duplicate calls.

Duplicate calls may arise in any number of different ways. For example, a first call from a cellular phone may be disconnected because of carrier loss, wherein the cellular phone immediately attempts a second call to re-establish its connection before the switch has completely torn down the first call. In another example, interference on the channel at the base station controller causes the controller to mark the first call as active, when in fact the cellular phone has completed its first call and has started a second call. In yet another example, a fraudulent cellular phone may be illegally using the valid MIN/ESN combination.

When simultaneous, duplicate MIN/ESN combinations are detected on a switch, the first cellular phone detected, the second cellular phone detected, or neither of the cellular phones can be terminated using the Clone Clear Feature of the switch Generally, these options are left to the discretion of the switch operator.

Calls terminated by the Clone Clear Feature are typically marked with a Call Final Class (CFC) "8E" hexadecimal value in their associated call records. When this particular CFC value is present in a call record, it is usually interpreted as an unbillable call by accounting systems. Unfortunately, this results in lost revenue in the first two examples described above, where the duplicate calls arose through the actions of a legitimate subscriber without the presence of clone activity.

Additionally, inherent to the Clone Clear Feature is a situation referred to as a "glare war." There are numerous scenarios that can cause a glare war. For example, a call placed by a legitimate cellular phone may be interrupted by the activity of a fraudulent cellular phone. The legitimate cellular phone may be forcibly disconnected by the Clone Clear Feature when the call from the fraudulent cellular phone occurs on the switch. The legitimate subscriber may perceive that a dropped call has occurred (which itself is detrimental to the carrier's reputation). If the legitimate subscriber attempts to re-connect, while the call from the fraudulent cellular phone is still connected, then the Clone Clear Feature will forcibly disconnect the call from the fraudulent cellular phone. If the fraudulent cellular phone attempts to immediately re-connect, using the same MIN/ESN combination as the legitimate subscriber, it is likely the call placed by the legitimate subscriber will once again be interrupted by the Clone Clear Feature.

While the Clone Clear Feature is efficient for minimizing fraudulent use, it can cause the indiscriminate termination of calls, including those placed by legitimate cellular phones. Thus, the Clone Clear Feature has its drawbacks when used by carriers. It can be seen, then, that there is a need for fraud control techniques which terminate only fraudulent calls when duplicate MIN/ESN combinations are detected on a switch.

SUMMARY OF THE INVENTION

To overcome the limitations in the prior art described above, and to overcome other limitations that will become apparent upon reading and understanding the present specification, the present invention discloses an apparatus and method for fraud control using enhanced techniques with a call interdiction feature of a switch. A system in accordance with the principles of the present invention includes a fraud control system that monitors calls, identifies both legitimate and fraudulent cellular phones, discriminates legitimate cellular phones from fraudulent cellular phones, and then transmits an interdiction message to the switch, wherein the interdiction message instructs the switch to terminate calls placed from fraudulent cellular phones, while allowing calls placed by legitimate cellular phones to continue undisturbed.

One aspect of the present invention is that the switch may terminate one, more than one, or none of the calls with identical MIN/ESN combinations. Another aspect of the present invention is that the interdiction message may comprise a call setup message having an identical MIN/ESN combination as the fraudulent cellular phone present on the switch, but including a special prefix and the called number associated with the call placed by the fraudulent cellular phone. Still another aspect of the present invention is that the switch recognizes and terminates the fraudulent call by comparing the called number in the interdiction message with the called numbers from the duplicate MIN/ESN combinations. Yet another aspect of the present invention is that the switch may mark the fraudulent call with a call code in its associated call record identifying it as a terminated call.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
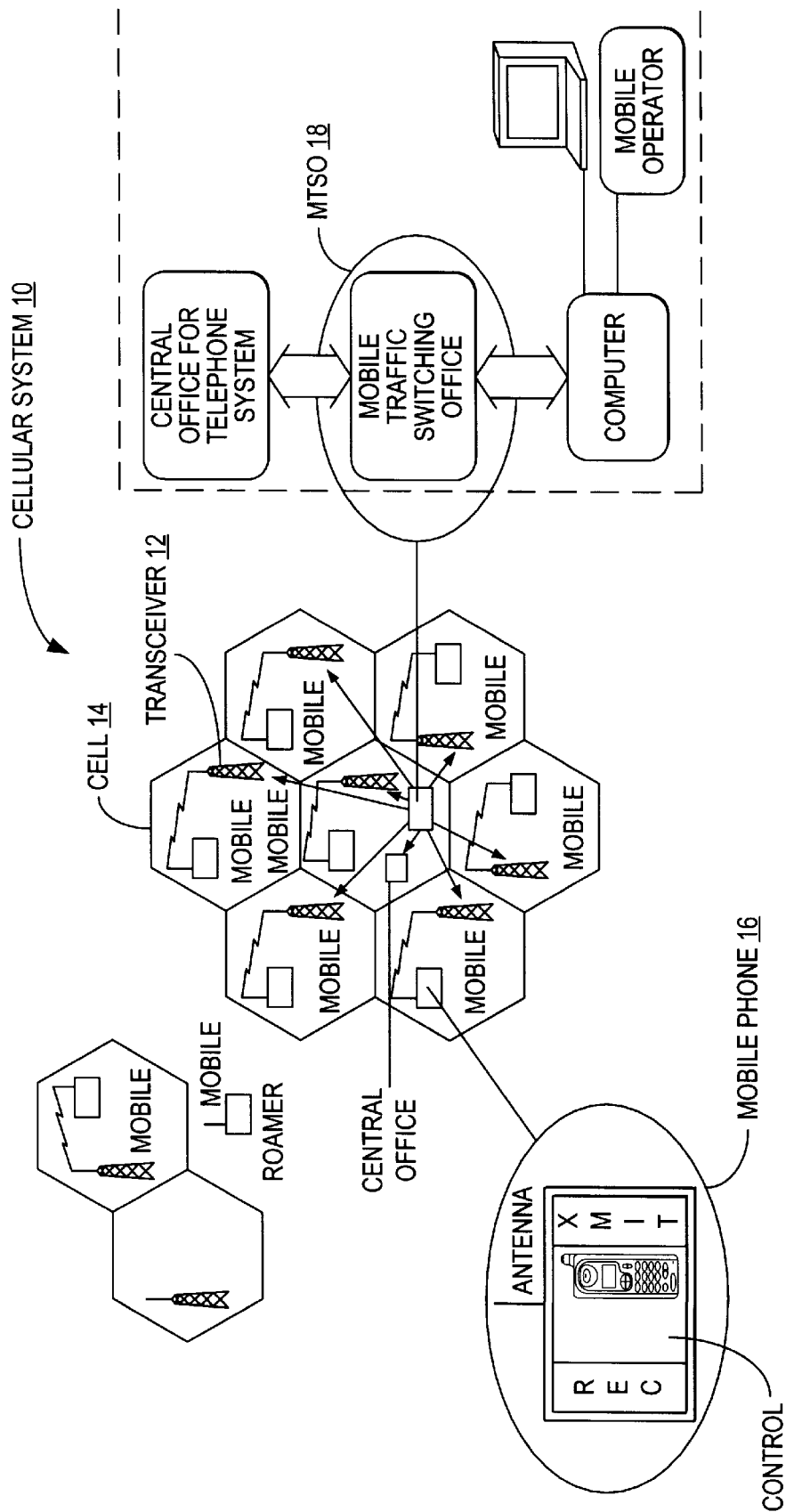
FIG. 1 is a diagram of a typical cellular phone system according to the present invention.

FIG. 1 is a diagram of a typical cellular phone system 10 according to the present invention. The basic concept of the cellular phone system 10 is to increase the availability of mobile phone service, which always has been a scarce luxury, by reducing the area covered by a transceiver 12 by reducing the power of transmission. In this way, concentrated areas of population can have more transceivers 12, and thus more channels, because each transceiver 12 handles a given number of conversations. In addition, because the transceivers 12 cover less area, the same frequency can be re-used in a common geographical area.

Within a cellular phone system 10, a service area is divided into regions called cells 14, each of which has the necessary equipment to transmit and receive calls to/from any cellular phone 16 located in the cell's coverage area, and to connect the calls to a switch. A transceiver 12 in each cell 14 can transmit and receive a plurality of channels in a specified frequency range simultaneously.

Each cell 14 has at least one setup channel dedicated for signaling between the cell 14 and cellular phones 16 located therein. The remaining channels are used for voice conversations or data sessions. Each channel may be used for many simultaneous voice conversations or data sessions in cells 14 which are not adjacent to one another, but are far enough apart to avoid excessive interference. Thus, a system 10 with a relatively small number of subscribers can use large cells 14, and as demand grows, the cells 14 are divided into smaller ones.

A cellular phone 16 consists of a control unit, a transceiver, and appropriate antennas. The transceiver contains circuits that can tune to any of the channels assigned to the cellular phone system 10. Each cellular phone 16 has a unique electronic serial number (ESN). Additionally, each cellular phone 16 is assigned a unique 10-digit mobile identification number (MIN) identical in form to any other telephone number. Users of the cellular phone 16 dial the local or long-distance number where applicable, as if calling from a fixed telephone. The cellular customer is typically charged a monthly connect charge as well as air-time usage charges for either incoming or outgoing calls.

Cells 14 are interconnected and controlled by a central Mobile Telecommunications Switching Office (MTSO) 18, which is basically a telephone switching office as far as hardware is concerned, but includes a substantial amount of additional digital equipment programmed for cellular control. The MTSO 18 not only connects the system 10 to the land telephone network, but also records call information for billing purposes.

Figure 2:
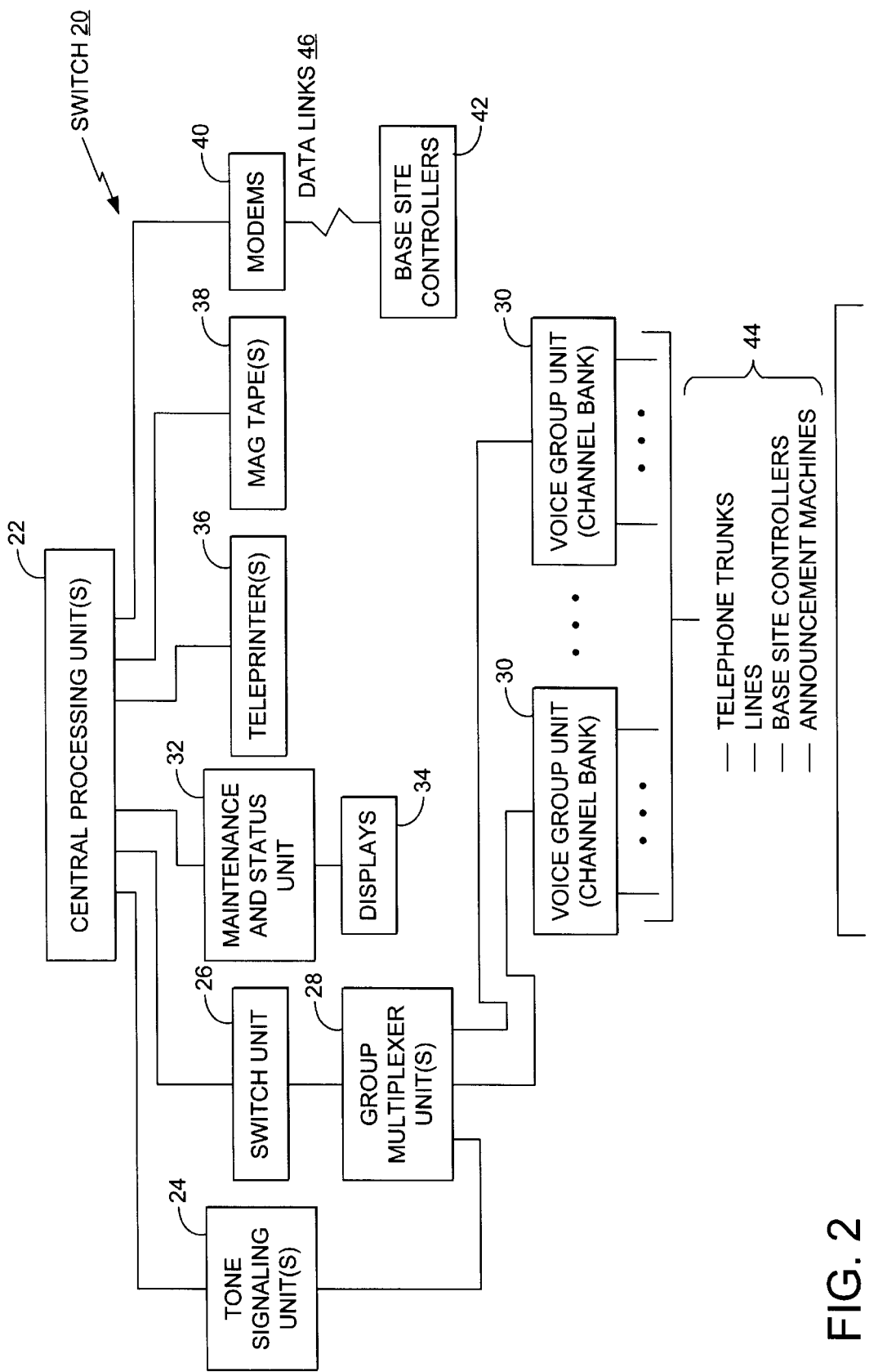
FIG. 2 illustrates the components of an exemplary cellular switch in a mobile telephone switch office according to the present invention.

FIG. 2 illustrates the components of an exemplary cellular switch 20 in an MTSO 18 according to the present invention. The cellular switch 20 may be, for example, a Motorola EMX Series switch or the switch of another manufacturer, and may include a CPU 22, tone signaling units 24, switch units 26, controlling group multiplexer units 28, and voice group units 30 for connection to telephone trunks, lines, base site controllers, and announcement machines. The switch 20 may further include maintenance and status units 32, displays 34, teleprinters 36, tape drives 38, and modems 40 connecting the switch 20 to base site controllers 42 which interface the switch 20 to the radiotelephone equipment in each cell 14 and provide the translation between data messages to and from the switch 20 and digital signaling to and from the cellular phone 16. The switch 20 is linked to the cells 14 by a group of voice trunks 44 for conversations, together with one or more data links 46 for signaling and control. Those skilled in the art will recognize that the invention is not meant to be limited by this example. Rather, this example is provided for illustration only, and other switches 20 may be used without departing from the invention.

The cellular switch 20 is designed specifically for radiotelephone service, and therefore has capabilities not found in central offices in land telephone network (handoff, roamer files, air-time records, etc.). Nevertheless, it may offer a selection of subscriber features found in most telephone exchanges, including Call Waiting, No-answer Transfer, Call Forwarding and Three-Party Conferencing.

When handling calls made from the cellular phone 16 to a land party, the switch 20 verifies the MIN/ESN combination of the cellular phone 16 and seizes one of the available trunk circuits 44. After receiving the appropriate signal from the central office of the land telephone network, it forwards the number of the land party being called.

When handling calls made from a land party to the cellular phone, the land party dials the number of the cellular phone 16 and the telephone network routes the call to the central office serving the switch 20. After receiving the digits, the switch 20 verifies and then forwards the digits on the data lines 46 to the base site controllers 42. Call processing software within the switch 20 performs the functions of responding to call events, establishing path connections, and collecting call data for billing purposes.

Figure 3:
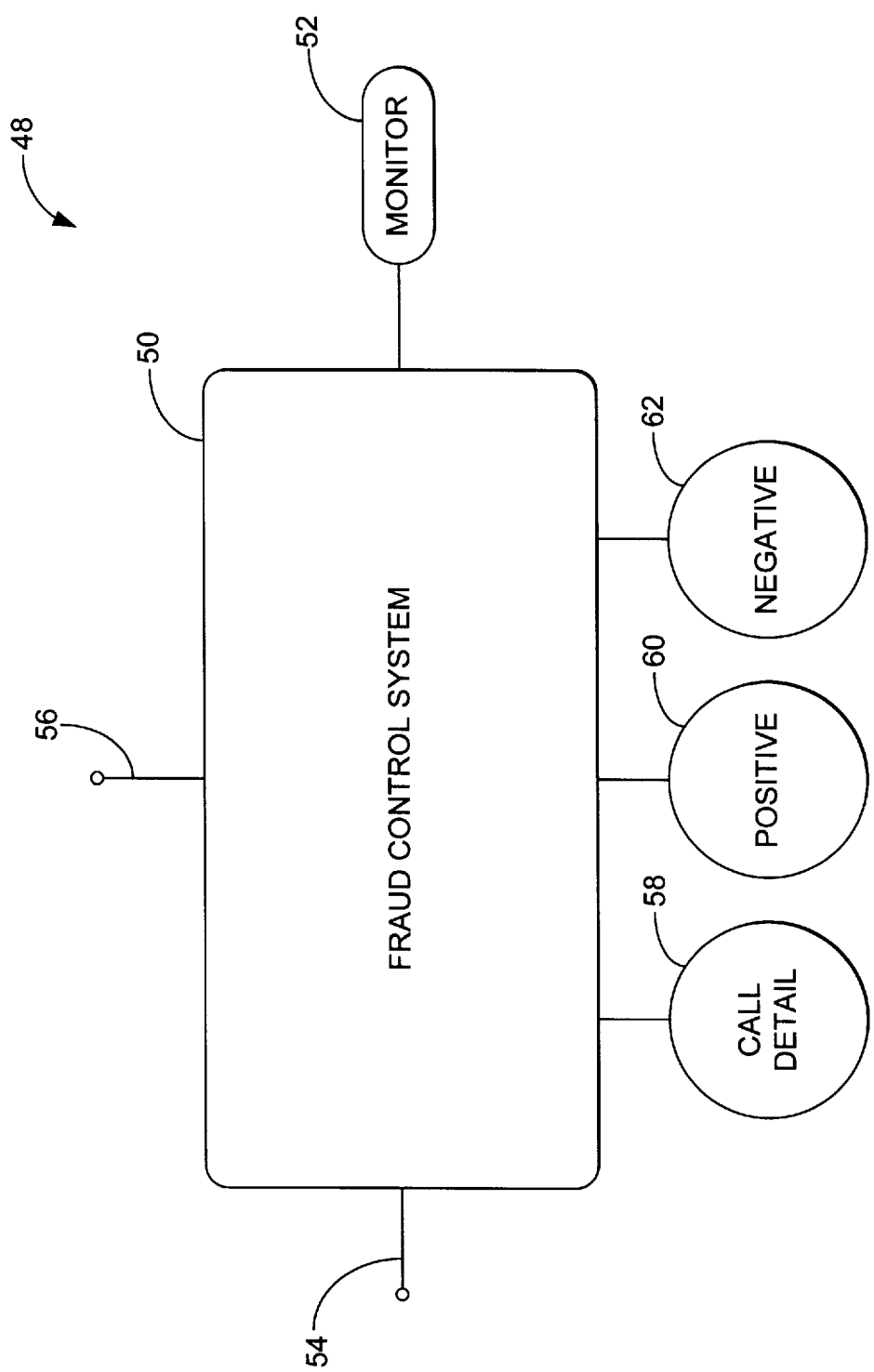
FIG. 3 is a block diagram further illustrating the components of an exemplary fraud control system coupled to the switch according to the present invention.

FIG. 3 is a block diagram illustrating the components of an exemplary fraud control system 48 coupled to the switch 20 according to the present invention. Preferably, the fraud control system 48 is a variation of the systems disclosed in the commonly assigned patent applications cited in the Cross-Reference to Related Applications above, all of which are incorporated by reference herein. However, those skilled in the art will recognize that different fraud control systems could also be used without departing from the scope of the present invention.

The fraud control system 48 comprises a CPU 50, one or more monitors 52, a data link 54 for receiving call records from a port of the switch 20 (or other network element), a data link 56 for transmitting interdiction messages to the switch 20, and (optionally) databases for call records 58, positive validation 60, and negative validation 62. In addition, the fraud control system 48 may be coupled to an radio frequency (RF) fingerprinting system, as described in the commonly assigned patent applications cited in the Cross-Reference to Related Applications above, all of which are incorporated by reference herein.

The fraud control system 48 performs real-time data collection of call records from the switch 20 into a call record database 58. Using a behavior profiling system and/or RF fingerprinting system, the fraud control system 48 scans the call records in the database 58 and extracts records corresponding to known patterns of probable legitimate and fraudulent use or activity. In behavior profiling, specific activities represented within the different fields of the call records are identified and flagged, including time, duration, cell, dialed digits, etc., and relative probabilities are assigned to the specific activities identified and flagged within the call records. In RF fingerprinting, legitimate and fraudulent cellular phones can be identified by RF transmission characteristics.

The fraud control system 48 indexes all call records in the call record database 58 associated with a specific MIN/ESN combination and the relative probabilities are accumulated towards an alarm threshold. The alarm threshold reflects an accumulated probability within some defined period. If the alarm threshold is reached, the MIN/ESN combination is identified as a fraudulent cellular phone.

In some cases, these identifications of fraudulent cellular phones are performed automatically by the fraud control system 48. In other cases, these identifications of fraudulent cellular phones are performed automatically by the fraud control system 48, and then verified through the intervention of an operator.

Once a fraudulent cellular phone is identified by the fraud control system 48, the positive and/or negative validation databases 60 and 62 are updated to reflect the identification. Moreover, the specific call placed by the fraudulent cellular phone is also identified by the fraud control system 48 using the call records. Thereafter, the called number associated with the specific call is extracted from the call records.

Once the specific call of the fraudulent cellular phone is identified, the fraud control system 48 generates a termination message comprising a command instructing the switch 20 to terminate the fraudulent call and a data field identifying the fraudulent cellular phone and its associated call. This interdiction message is then transmitted from the fraud control system 48 to the switch 20 for execution. The switch 20 receives the interdiction message, interprets it, and then searches for the call placed by the fraudulent cellular phone using the data field. Once the call is located, the switch 20 terminates the call.

Although the interdiction message may be in any format agreed upon and recognizable by both the switch 20 and the fraud control system 48, the preferred embodiment formats the interdiction message as a call setup request from a cellular phone, and the interdiction message is transmitted as a standard cellular phone call to the switch 20. The call setup request includes the identified MIN/ESN combination of the fraudulent cellular phone and the called number associated with the call placed by the fraudulent cellular phone. The called number is altered to include a System Prefix (SP), e.g., a string of digits such as "*999", preceding the called number. The System Prefix acts as a command within the interdiction message instructing the switch 20 to terminate the associated call. The fraud control system 48 then transmits the call setup request to the switch 20.

It is envisioned that the data link 56 is a radio frequency (RF) communications channel established by a modified transceiver at the fraud control system 48, wherein the transceiver communicates with the switch 20 in a manner identical to a cellular phone. Alternatively, the data link 56 may comprise a radio frequency (RF) communications channel established by a controller at the fraud control system 48, wherein the controller communicates with the switch 20 in a manner identical to a base site controller 42 at a cell 14.

The switch 20 receives the call setup request from the fraud control system 48 and is programmed to recognize the System Prefix as a command instructing it to terminate the call identified by the called number and associated with the MIN/ESN combination. The switch 20 searches for the identified call, and if it is found, terminates the call. After terminating the call, the switch 20 marks the call records associated with the terminated call with a call code identifying it as a terminated call. The call placed by the legitimate cellular phone is left undisturbed.

Figure 4:
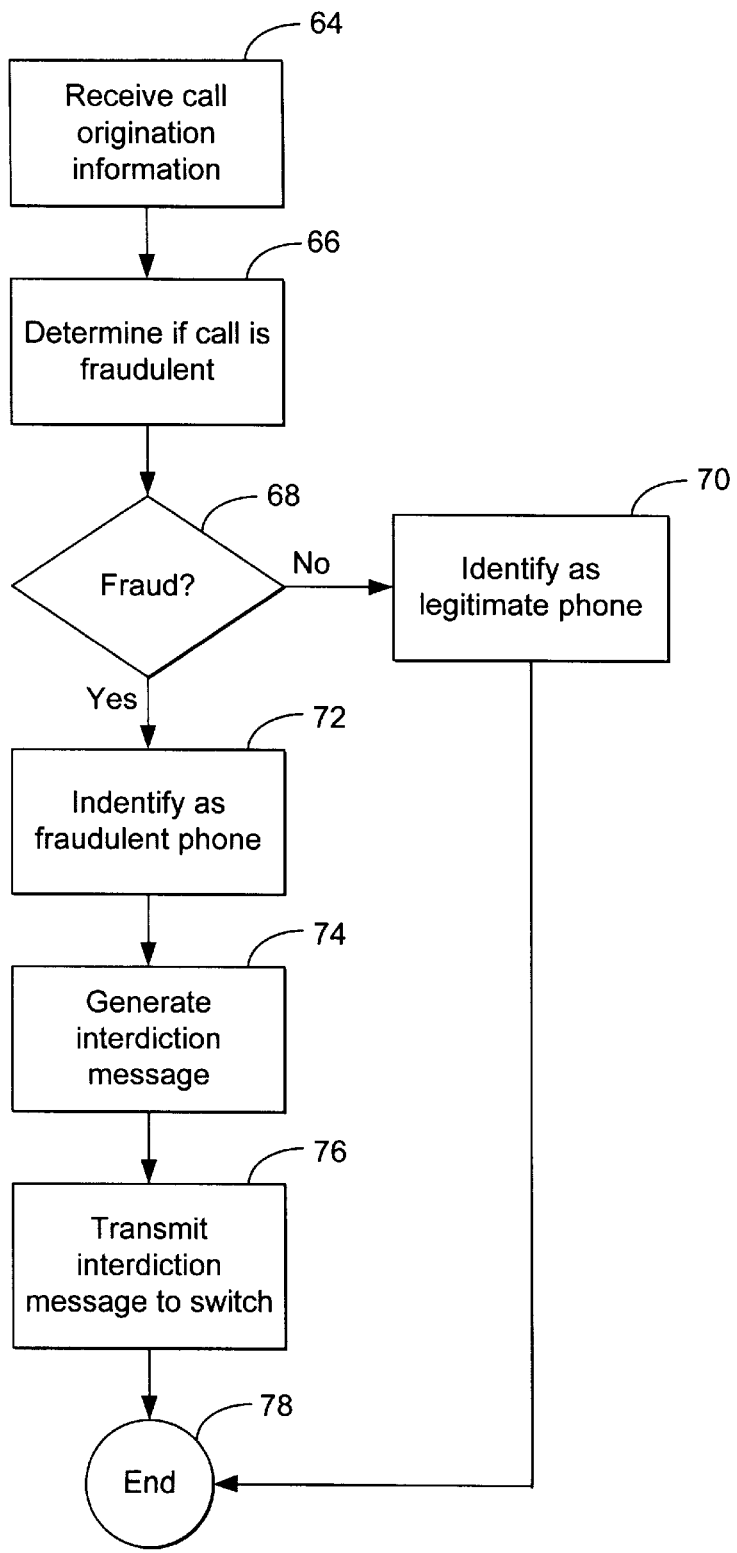
FIG. 4 is a flowchart illustrating the steps performed by the fraud control system according to the present invention.

FIG. 4 is a flowchart illustrating the steps performed by the fraud control system according to the present invention.

Block 64 represents the fraud control system 48 receiving call origination information via call records received from the switch 20 and storing the call records in the call database 58, wherein the call records are associated with a specific MIN/ESN combination. The call records received from the switch 20 comprise an indication that a specific cellular phone 16 has placed a call in the cellular phone system 10 and document any number of different call events or billing actions beginning from call setup through call completion.

Block 66 represents the fraud control system 48 determining whether the call is fraudulent, through behavior profiling, RF fingerprinting, and/or other techniques. If the call is not fraudulent as represented by Block 68, then control transfers to Block 70; otherwise, control transfers to Block 72.

Block 70 represents the fraud control system 48 identifying the MIN/ESN combination as a legitimate cellular phone.

Block 72 represents the fraud control system 48 identifying the MIN/ESN combination as a fraudulent cellular phone.

Once the call is identified as fraudulent, Block 74 represents the fraud control system 48 extracting the information regarding the call setup request from the call records (usually from the initial call records in the sequence) and generating the interdiction message.

Block 76 represents the fraud control system 48 transmitting the interdiction message to the switch 20 for execution.

Block 78 terminates the logic.

Figure 5:
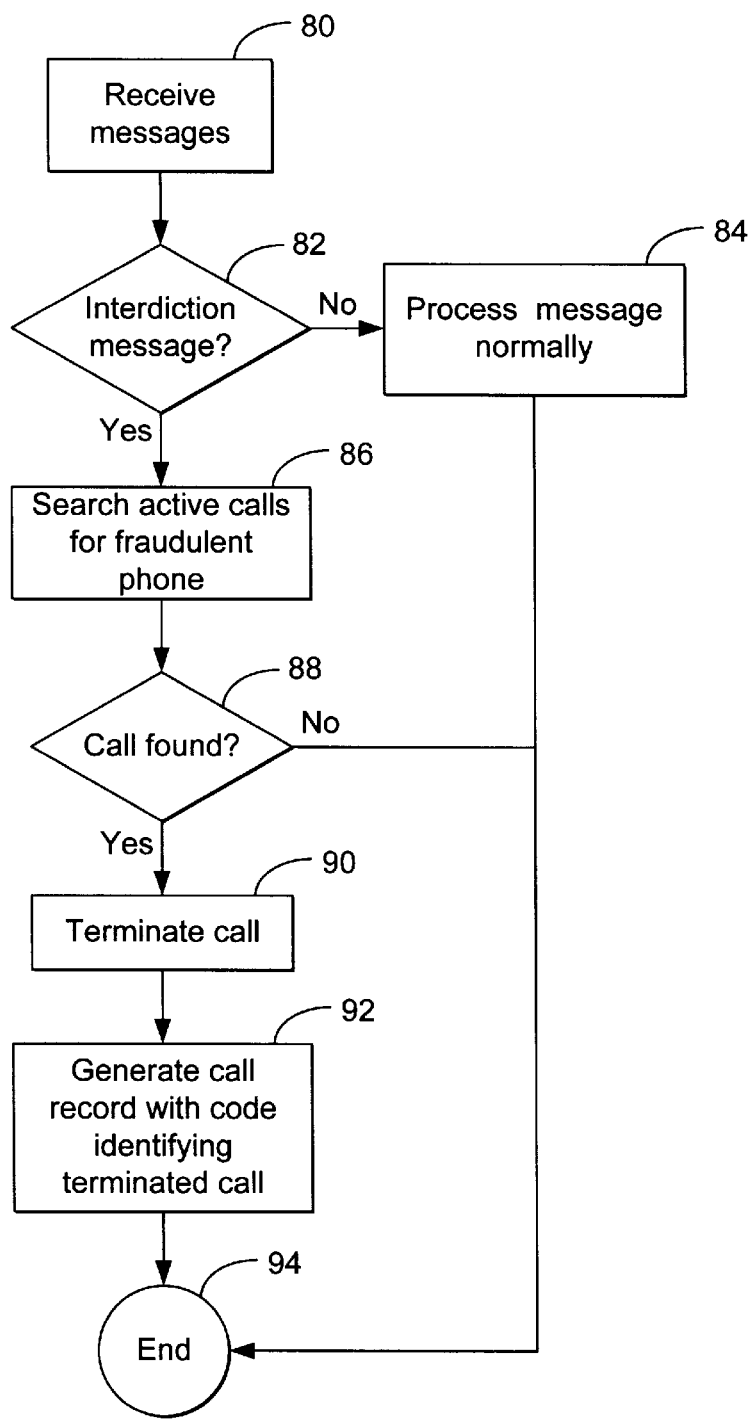
FIG. 5 is a flowchart illustrating the steps performed by the switch according to the present invention.

FIG. 5 is a flowchart illustrating the steps performed by the switch 20 according to the present invention. Preferably, the steps performed by the switch 20 comprise a variation of the Clone Clear Feature found in Motorola switches 20, although those skilled in the art will recognize that other switch types may be programmed in a similar manner to perform the recited steps.

Block 80 represents the switch 20 receiving messages, such as call setup requests, etc.

Block 82 is a decision block representing the switch 20 determining whether the message is an interdiction message from the fraud control system 48. If not, then control transfers to block 84; otherwise control transfers to block 86.

Block 84 represents the switch 20 processing the non-interdiction message in a normal manner.

Block 86 represents the switch 20 searching its active calls for one having a MIN/ESN combination and a called number matching the interdiction message.

Block 88 is a decision block that represents the switch 20 determining whether a matching call was found. If not, control transfers to block 94, which ends the steps; otherwise control transfers to block 90.

Block 90 represents the switch 20 terminating the call identified by the called number and associated with the MIN/ESN combination.

Block 92 represents the switch 20 generating a call record recording the termination event, wherein the call record contains a call code identifying it as a terminated call.

Block 94 terminates the logic.

In summary, the present invention discloses a method and apparatus for fraud control using enhanced techniques with the overlapping call interdiction feature of a switch. A system in accordance with the principles of the present invention includes a fraud control system that monitors calls, identifies both legitimate and fraudulent cellular phones, discriminates legitimate cellular phones from fraudulent cellular phones, and then transmits an interdiction message to the switch, wherein the interdiction message instructs the switch to terminate calls placed from fraudulent cellular phones, while allowing calls placed by the legitimate cellular phones to continue undisturbed.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of preventing fraud in a cellular phone system, comprising the steps of:

(a) receiving an indication at a computer coupled to a switch in the cellular phone system that a specific cellular phone has placed a call in the cellular phone system;

(b) identifying the specific cellular phone as fraudulent in the computer;

(c) generating an interdiction message in the computer for the call placed by the fraudulent cellular phone in the cellular phone system, wherein the interdiction message comprises a called number for the call placed by the fraudulent cellular phone in the cellular phone system, a mobile identification number (MIN) and electronic serial number (ESN) for the fraudulent cellular phone, and a command instructing the switch to terminate the call placed by the fraudulent cellular phone; and (d) transmitting the interdiction message from the computer to the switch in the cellular phone system, wherein the switch matches the call placed by the fraudulent cellular phone with the interdiction message and terminates the call in response to the interdiction message.

2. The method of claim 1, wherein the receiving step comprises the step of receiving the indication at the computer coupled to the switch in the cellular phone system that two or more cellular phones having duplicate mobile identification numbers (MINs) and electronic serial numbers (ESNs) have placed calls simultaneously in the cellular phone system.

3. The method of claim 1, wherein the identifying step comprises the step of comparing the call to known patterns of legitimate use.

4. The method of claim 1, wherein the identifying step comprises the step of comparing the call to known patterns of fraudulent use.

5. The method of claim 1, wherein the identifying step comprises the step of using RF signature information to determine if the call is fraudulent.

6. The method of claim 1, wherein the command comprises a System Prefix appended to the called number for the call placed by the fraudulent cellular phone.

7. The method of claim 6, wherein the interdiction message comprises a call setup request.

8. An apparatus for preventing fraud in a cellular phone system, comprising:

(a) a fraud control system, comprising means for receiving an indication that a specific cellular phone has placed a call in the cellular phone system, means for identifying the specific cellular phone as fraudulent, means for generating an interdiction message for the call placed by the fraudulent cellular phone in the cellular phone system, wherein the interdiction message comprises a called number for the call placed by the fraudulent cellular phone in the cellular phone system, a mobile identification number (MIN) and electronic serial number (ESN) for the fraudulent cellular phone, and a command instructing the switch to terminate the call placed by the fraudulent cellular phone, and means for transmitting the interdiction message to a switch in the cellular phone system; and (b) a switch coupled to the fraud control system, comprising means for receiving the interdiction message generated by the fraud control system, means for identifying the call placed by a fraudulent phone using the interdiction message, and means for terminating the identified call placed by the fraudulent cellular phone in response to the interdiction message.

9. The apparatus of claim 8, wherein the means for receiving comprises means for receiving an indication that two or more cellular phones having duplicate mobile identification numbers (MINs) and electronic serial numbers (ESNs) have placed calls simultaneously in the cellular phone system.

10. The apparatus of claim 8, wherein the means for identifying comprises means for comparing the call to known patterns of legitimate use.

11. The apparatus of claim 8, wherein the means for identifying comprises means for comparing the call to known patterns of fraudulent use.

12. The apparatus of claim 8, wherein the means for identifying comprises means for using RF signature information to determine if the call is fraudulent.

13. The apparatus of claim 8, wherein the command comprises a System Prefix appended to the called number for the call placed by the fraudulent cellular phone.

14. The apparatus of claim 11, wherein the interdiction message comprises a call setup request.

* * * * *